United States Patent
Suhail et al.

(10) Patent No.: US 7,110,763 B2
(45) Date of Patent: Sep. 19, 2006

(54) GRAPHICAL PROXY FOR LESS CAPABLE TERMINALS

(75) Inventors: Atiya Suhail, Richardson, TX (US); Kashipati G. Rao, Plano, TX (US); Thierry Labbe, Claman (FR)

(73) Assignee: Alcatel, Paris (FR)

( * ) Notice: Subject to any disclaimer, the term of this patent is extended or adjusted under 35 U.S.C. 154(b) by 479 days.

(21) Appl. No.: 10/317,447

(22) Filed: Dec. 12, 2002

(65) Prior Publication Data

US 2004/0114603 A1    Jun. 17, 2004

(51) Int. Cl.
*H04Q 7/20* (2006.01)

(52) U.S. Cl. .................. 455/435.1; 455/410; 455/411; 370/352

(58) Field of Classification Search ............. 455/435.1, 455/26.1, 410, 411; 370/352, 400; 379/90.01; 709/223, 227; 707/203, 104.1
See application file for complete search history.

(56) References Cited

U.S. PATENT DOCUMENTS

| | | | |
|---|---|---|---|
| 6,385,644 | B1 | 5/2002 | Devine et al. |
| 6,397,246 | B1 * | 5/2002 | Wolfe ......................... 709/217 |
| 6,502,106 | B1 * | 12/2002 | Gampper et al. ......... 707/104.1 |
| 6,775,362 | B1 * | 8/2004 | Ransom .................... 379/93.17 |
| 2003/0147378 | A1 * | 8/2003 | Glasser et al. ............. 370/352 |
| 2004/0024879 | A1 * | 2/2004 | Dingman et al. .......... 709/227 |
| 2004/0073642 | A1 * | 4/2004 | Iyer .......................... 709/223 |

FOREIGN PATENT DOCUMENTS

| | | |
|---|---|---|
| WO | WO 00/48375 A1 | 8/2000 |
| WO | WO 02/07407 A1 | 1/2002 |
| WO | WO 02/35789 A2 | 5/2002 |

OTHER PUBLICATIONS

Ganti, et al.; MPLS Support of Differentiated Services Using E-LSP; IETF Differentiated Services Working Group; Internet Draft; Apr. 2001; pp 1-14.
Handley, et al.; SIP: Session Initiation Protocol: IETF Network Working Group, RFC 2543; Mar. 1999; pp. 1-153.

* cited by examiner

*Primary Examiner*—Joseph Feild
*Assistant Examiner*—Huy D. Nguyen
(74) *Attorney, Agent, or Firm*—Anderson, Levine & Lintel; Bobby D. Slaton; Jessica W. Smith

(57) ABSTRACT

A voice over IP (VOIP) network 8 includes a graphical proxy server 34 that allows "dumb" terminals (32) to act as SIP phones or H.323 phones; only the graphical proxy server (34) needs to support the underlying signaling protocol. The graphical proxy server (34) includes a graphical server (40) and a terminal management system (42). The terminal management system (42) handles the calls for each associated graphical terminal (32) and interacts with the graphical server (40) to provide a customized GUI for each graphical terminal (32) to display current call status. Each terminal (32) has a respective instance of a terminal controller program (56) in the terminal management system (42). The terminal controller for a terminal (32) controls the terminal's GUI responsive to incoming SIP messages directed to the terminal and generates SIP messages responsive to user interaction with the terminal's GUI.

12 Claims, 4 Drawing Sheets

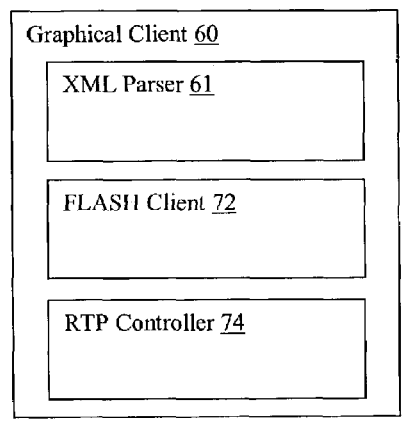
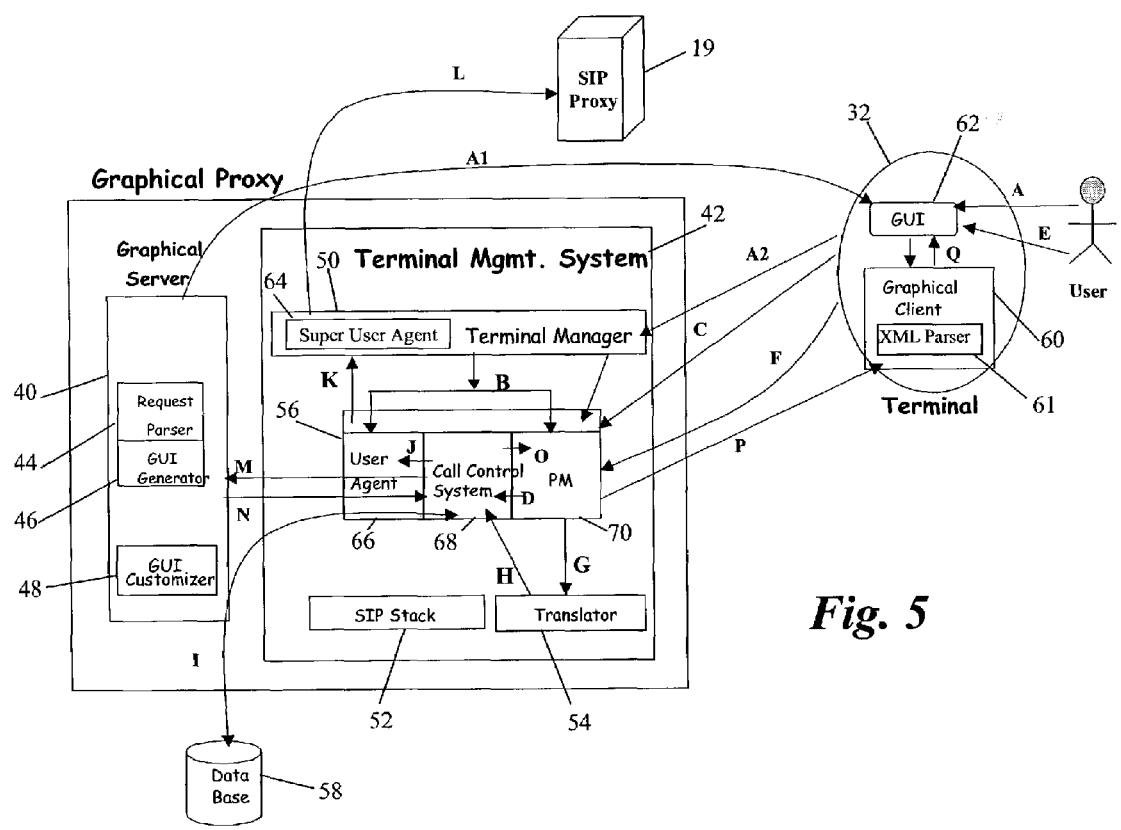
*Fig. 4*
*Fig. 5*

GRAPHICAL PROXY FOR LESS CAPABLE TERMINALS

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to a digital communications network.

2. Description of the Related Art

Over the last two decades, communications capabilities have increased dramatically. Current communication networks are now capable of providing sophisticated features such as multiple party conferencing with multiple private sidebar conversations, programmable "follow-me" calling, and sophisticated voice mail options.

Unfortunately, the main interface to a communication network, the 12-key telephone pad, has not appreciably changed for many decades. As a result, using many of the most desirable features is clumsy and non-intuitive. Recently, SIP (Session Initiation Protocol) was developed to assist in providing advanced telephony services using VOIP (Voice over Internet Protocol) over a digital communication network (which could include the Internet or other global data network). Using a telephone with a graphical interface, a user can easily create, modify and terminate multiple telecommunications sessions with one or more participants by manipulating objects on the telephone screen.

VOIP phones, however, are not without shortcomings. First, the phones are very expensive compared to normal phones. Second, the phones are difficult to upgrade—therefore, the availability of new features may necessitate a new phone as well. Third, the operation of a VOIP phone varies from phone-to-phone, since each SIP phone manufacturer is free to design its own GUI. If a user purchases multiple phones from different vendors, each phone will operate differently, diminishing the value of the enhanced user interface.

Therefore, a need has arisen for a VOIP phone with an upgradeable, consistent interface.

BRIEF SUMMARY OF THE INVENTION

In the present invention, a communications system comprises a digital network with a plurality of communication devices coupled to the network for enabling communications sessions responsive to commands conforming to a known protocol. A plurality of processing devices are coupled to the network and communicate by sending and receiving packetized data over the network during the communications sessions. One or more graphical proxy servers are coupled to the processing devices for registering on behalf of the processing devices, such that messages intended for the processing devices are received by the one or more graphical proxy servers. In response to receiving messages for a particular processing device in the known protocol, the associated graphical proxy server generates displays for the particular processing device, such that the particular processing device does not need to interpret messages in the known protocol. In response to receiving control information regarding interaction of the user with the display, the graphical proxy server may generate messages in the known protocol.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 4 illustrates a block diagram of a graphical client of a graphical terminal associated with a graphical proxy server.

FIG. 5 illustrates the steps for registration/log-in;

DETAILED DESCRIPTION OF THE INVENTION

The present invention is best understood in relation to FIGS. 1–7 of the drawings, like numerals being used for like elements of the various drawings.

Figure 1:
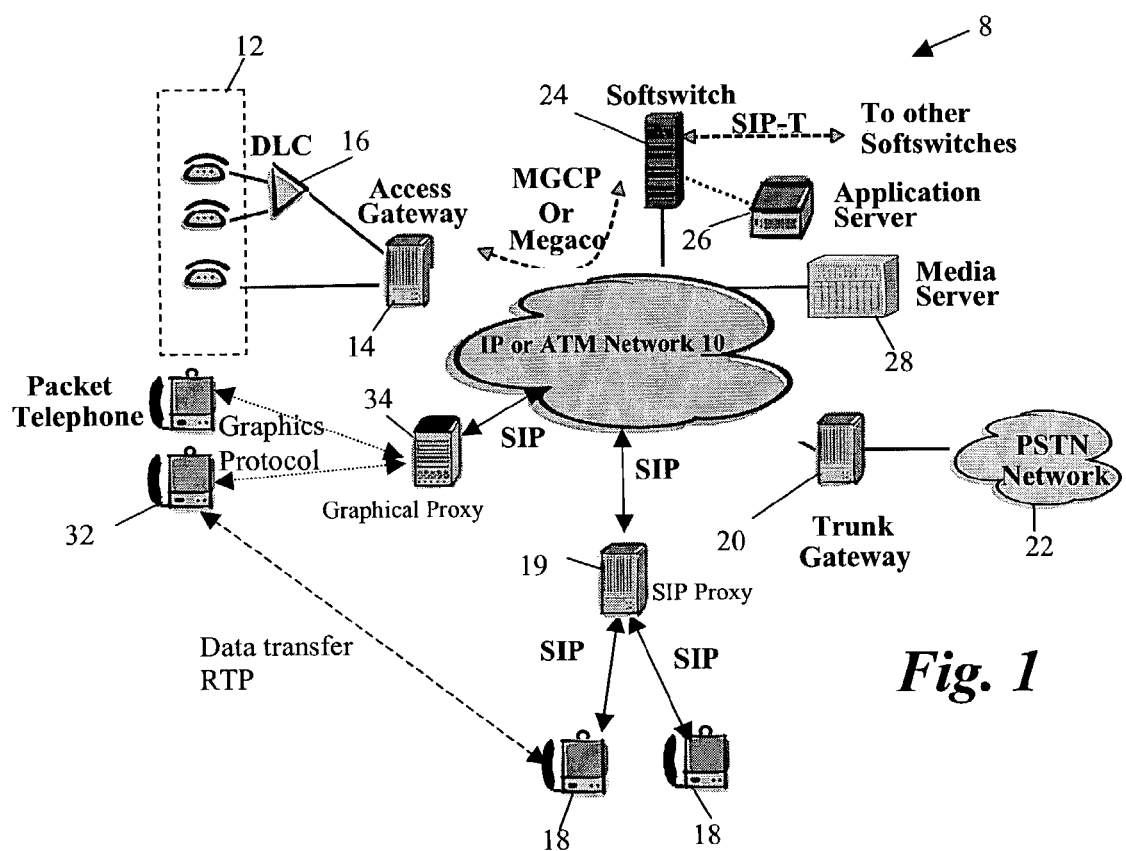
FIG. 1 illustrates a block diagram of a VOIP network.

FIG. 1 illustrates a block diagram of a VOIP network 8 of the type described in U.S. Ser. No. 10/092,075, entitled "Graphical Telephone System", filed Mar. 6, 2002 to Ransom, which is incorporated by reference herein. A packet-based network 10 is the main carrier of telecommunications traffic. The network 10 could use, for example, IP (Internet Protocol) or ATM (Asynchronous Transfer Mode). Legacy telephone equipment 12 (i.e., present-day telephones and similar equipment compatible with the public switched telephone network) is coupled to the network 10 via access gateways 14, either directly or through digital loop carriers 16. The access gateways 14 interface between the analog legacy telephone equipment and the network 10, using a protocol such as MGCP (Media Gateway Control Protocol) or MEGACO (H.248).

SIP telephones 18 (or other VOIP phones, such as H.323 phones) and SIP proxy server 19 can be connected directly to the network 10. SIP telephones 18 are intelligent devices that contain processors that are independent from a central switching location (i.e., a central office) and have one or more processors to create, modify and terminate communication sessions.

A trunk gateway 20 provides an interface between the packet network 10 and the PSTN (public switched telephone network) 22.

Softswitches 24, application servers 26 and media servers 28 are instrumental in providing advanced functions. A softswitch 24 is a software-based entity that provides call control functionality. A softswitch 24 may support multiple packet-based protocols, such as SIP, MGCP, MEGACO and multiple telephony and data protocols, such as CAS, INAP, ISDN, SS7, TCAP, TCP/IP. A softswitch 24 may interface with the PSTN 22 through various gateways.

In a SIP environment, a softswitch 24 may act as a SIP proxy server for name resolution and user location—similar to domain server. In this way, a name (similar to a domain name) can be dynamically associated with a current IP address. Also, a SIP proxy server may be used for redirection of packets, where the proxy server "pretends" to the other network elements that it is the user's SIP terminal and forwards messages to the real SIP terminal (or conceivably to another SIP Proxy).

Application servers 26 provide services that may result in termination of a call, such as voice mail, conference bridging, pre-paid calling, or delivering services and information to an end user. An application server can be coupled to other data networks, such as the Internet, to gain access to information systems.

Media servers 26 provide media processing under control of a media gateway controller (not shown). The media server 26 could provide, for example, voice storage and responses for voice mail, or video streams.

Graphical terminals (described below) 32 communicate with an associated graphical proxy 34 with other SIP phones (and similar VOIP devices) over the network 10 using a graphics protocol between the graphics terminals 32 and the graphical proxy 34, where the graphics protocol controls the GUI of the graphics terminal and provides control information to the graphical proxy 34 regarding a user's actions with the packet phone's GUI. The graphical proxy 34 communicates with other devices over the network using SIP (or similar protocol).

U.S. Ser. No. 10/092,075, referenced above, describes the use of a graphical proxy 34 to control the GUI of a "dumb" packet phone, rather than an "intelligent" SIP phone. This provides a significant advantage over the prior art, since the network provider could control the GUI of the packet telephones to add value to the network services and to improve the consistency of the user interface between phones.

A large class of computing devices could function as a graphics terminal 32, even though these devices do not have the client communication stack normally associated with a packet phone. Mainly, a graphics terminal 32 includes sound and display capabilities, with network communications functionality. Devices of this type would include personal computers (including desktop and portable computers), personal digital assistants (PDAs, including pocket PCs) and so on. It is assumed that these devices include browser software with pluggable and downloadable MACROMEDIA FLASH (or other interactive graphics design software) and have a TCP/IP and RTP (Real-time Transport Protocol) stack.

Figure 2:
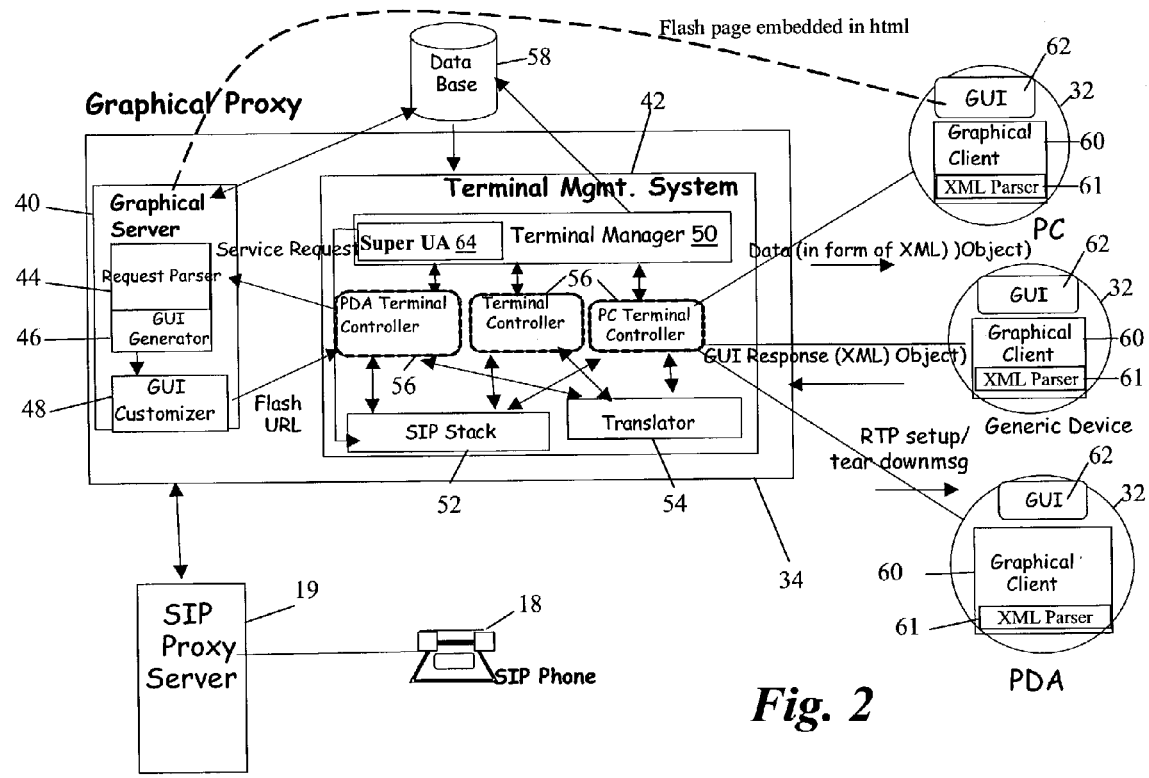
FIG. 2 illustrates a block diagram of a graphical proxy server.

FIG. 2 illustrates a block diagram of a graphical proxy 34 which supports graphical terminals 32 of the type described above, which do not have a client communication stack. The graphical proxy 34 includes two major functional blocks, a graphical server 40 and a terminal management system 42. The graphical server 40 includes a request parser 44, a GUI generator 46 and a GUI customizer 48. The terminal management system 42 includes a terminal manager 50, a SIP stack 52, a translator 54, and multiple instances of terminal controllers 56, where each instance of a terminal controller 56 is associated with a respective graphical terminal 32. The graphical server 40 and the terminal management system 42 are in communication with a database 58. For purposes of illustration, three graphical terminals are shown: a personal computer 32a, a generic processing device 32b and a PDA 32c. Each graphical terminal 32 includes graphical client software 60 and GUI software 62.

The terminal management system 42 is responsible for registering the associated graphical terminals 32 with the graphical proxy 34 and then registering on behalf of each associated graphical terminal 32 with the SIP Proxy 19. The terminal management system 42 handles the calls for each associated graphical terminal 32 and interacts with the graphical server 40 to provide a customized GUI for each graphical terminal 32 to display current call status.

The terminal manager 50 manages all the associated graphical terminals 32. When a user starts the FLASH client on a graphical terminal 32, the graphical terminal establishes a connection with the terminal manager 50. The terminal manager 50 then instantiates a terminal controller 56 for that graphical terminal 32 and maintains the mapping between the graphical terminal 32 and the respective terminal controller 50. The terminal manager 50 implements a Super user agent 64, which receives requests for connection for all terminals 32, identifies which terminal associated with the request, and then passes the request to the user agent 66 (see FIG. 3) in the terminal controller 56 for the particular terminal. The Super User Agent 64 is also responsible for registering each terminal 32 with the SIP Proxy server 19. To the SIP proxy server 19, the Super user agent 64 appears as the individual user agent for a terminal.

Figure 3:
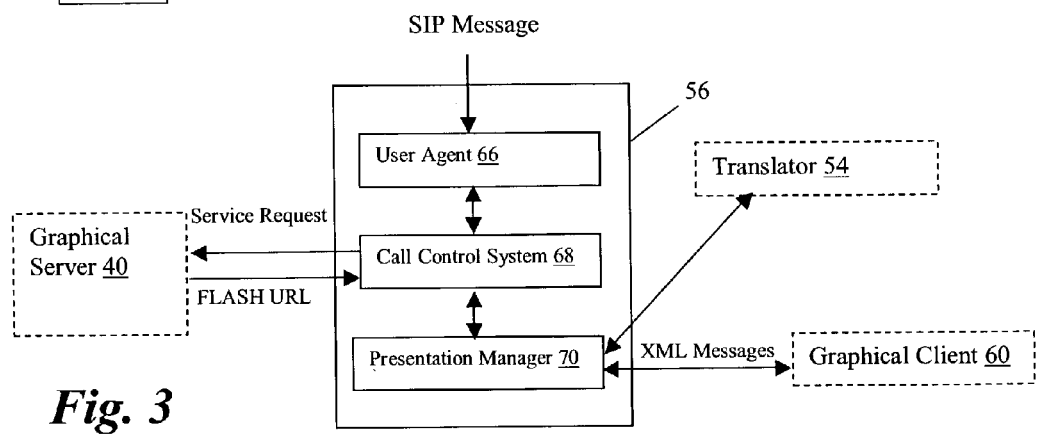
FIG. 3 illustrates a block diagram of terminal controller used in the graphical proxy and it interaction with other components of the graphical proxy.

FIG. 3 shows different components of the terminal controller 56 and their interaction with other components of the graphical proxy 34. There is one terminal controller 56 instantiated for each terminal 32. Each terminal controller 56 includes a user agent 66, a call control system 68 and a presentation manager 70. The User agent 66 receives and sends SIP messages on behalf of the associated graphical terminal 32 (while the present invention is described in connection with the SIP protocol, the user agents 66 could support any available protocol, such as H.323, MGCP, MEGACO, any protocol developed in the future, or multiple protocols). The user agent 66 processes SIP requests and response messages coming to the terminal 32 and provides relevant information to the call control system 68. For example, when the user agent 66 receives an INVITE message for its terminal 32, it processes that message and informs the call control system 68 that there is a request for connection or incoming call for its associated terminal 32 from Caller X and the desired media for communication. The user agent 66 also generates appropriate SIP requests and response messages based on the information it gets from the call control system 68 responsive to user responses.

By using a Super user agent 64 to receive and send SIP messages to the SIP proxy server 19, only a single port is needed to receive and send messages associated with all terminal controllers. If each user agent was separately registered on behalf of its associated graphical terminal 32, a separate port would required for each terminal controller.

The call control system 68 handles incoming and outgoing calls for its associated terminal 32 and manages all active calls. It gets information on the incoming messages from the user agent 66 and provides information on user responses back to the user agent. The call control system 68 also generates service requests and sends them to the graphical server 40 to get a URL (Uniform Resource Locator) for an appropriate FLASH page displaying the desired user interface screen.

For example, if there is an incoming call, the call control system 68 generates a request to "show incoming call". The graphical server 40 then returns the URL of the FLASH page with the display for an incoming call. The incoming call FLASH page may include multiple graphical elements, but will not include specific text relevant to the current call, such as the name of the caller. The call control system 68 assembles the URL and the data that has to be filled in the FLASH page such as the Callers and Callee's name in the form of XML message and passes it to the presentation manager 70. The FLASH client 60 on the associated terminal 32 has a built in XML parser 61; it loads the FLASH page from the given URL and fills the fields with the data provided in the XML message. The call control system 68 also receives GUI response messages from the terminal 32 through the presentation manager 70 and invokes the translator 54 to parse the XML messages and translate them to JAVA objects that can be used by the call control system 68. The call control system 68 also sends RTP setup and RTP tear down messages to the RTP controller 74 (See FIG. 4) through FLASH on the terminal. RTP setup message is sent when the call setup is complete and the terminal has to set up RTP session with the remote party to start sending/receiving media. Similarly RTP tear down message is sent to the terminal if the user at the terminal or the remote party ends the call.

The presentation manager 70 manages the display of its associated terminal 32. The terminal 32 could support several "phone lines"; in other words a single terminal can handle more than one active call at a time. The presentation manager 70 maintains individual folders for different calls. The call control system 68 sends the graphical representation of call status for a particular call to the presentation manager 70. The presentation manager 70 decides where to display this graphical representation. In a preferred embodiment, the presentation manager 70 communicates with the graphical client 60 in FLASH through XML sockets.

Referring again to FIG. 2, the translator 54 translates the GUI response messages (indicating user actions, such as pressing a button or icon) coming from the terminal 32 in XML format to JAVA objects and translates JAVA objects to XML messages that have to be sent to the terminal 32. This two way mapping between JAVA and XML may be done using JAVA Architecture for XML Binding (JAXB). JAXB compiles an XML schema into one or more JAVA technology classes. The combination of the schema derived classes and the binding framework enables to perform the following operations on an XML document:

unmarshal XML content into a JAVA representation. This JAVA representation can then be used by call control system to extract the information from the XML message;

access, update and validate the JAVA representation against schema constraint;

marshal the JAVA representation of the XML content into XML content. This is used by the call control system to generate XML messages that are sent to the user terminal.

The graphical server 40 generates the GUI for the terminals 32. For each associated terminal 32, the graphical server queries the database 58 to get the display capabilities of the terminal, such as size of the screen, depth of color etc. These capabilities are provided to the terminal manager 50 by the terminal 32 at the time of registration and stored in the database 58. When the graphical server 40 receives a request for a GUI, it customizes the GUI to the capabilities of the particular terminal. The graphical server 40 includes a GUI generator 46 and a GUI customizer 48.

The GUI generator 46 stores a stack of static FLASH pages. The request parser 44 parses the service requests coming from the terminal controllers 56. Based on the particular service request, the GUI generator returns an appropriate FLASH page URL to the requesting terminal controller 56.

The GUI customizer 48 customizes a selected FLASH page based on the capabilities of the particular graphical terminal 32.

The graphical proxy 34 uses the database 58 (which could be part of the graphical proxy 34 or a separate device) to store user related information. The information stored in the database 58 includes: (1) user name and password of registered users, (2) display capabilities of different terminals such as size of the screen color depth etc, (3) media features that the user would like to use for communication with the remote party and (4) telephony features that the user has subscribed to such as Call Forwarding, Conferencing, Breakout room etc.

A graphical client application 60 runs on each terminal 32. FIG. 4 illustrates a block diagram of the graphical client 60. In additions to the XML parser 61, the graphical client 60 includes: (1) A FLASH client 72 to establish a TCP/IP connection with the graphical proxy 34 and for loading the login FLASH page from the graphical server 40 and (2) an RTP controller 74 responsible for setting up and tearing down the RTP session between the terminal 32 connected to the graphical proxy 34 and the remote party terminal. The RTP session has to be set up by the terminal because media does not go through the graphical proxy. Since the call set-up and tear down is controlled by the graphical proxy 34, the graphical proxy sends messages to the RTP controller 72 on the terminal 32 regarding when to set up and break down the RTP session along with the required parameters.

The architecture described in connection with FIGS. 1–4 allows "dumb" terminals to act as VOIP phones, such as SIP phones or H.323 phones; the graphical proxy 34 only needs to support the underlying signaling protocol. The graphical proxy 34 can be updated to support new protocols without the need to update the terminals 32.

As an illustration of the operation of the network 8, FIG. 5 illustrates the steps for registration/log-in. The steps include:

A. User initiates the FLASH client 72 on the terminal.
    A1. FLASH client 72 establishes an HTTP (Hyper Text Transfer Protocol) connection with the graphical server 40 and downloads the initial FLASH page that allows the user to Register/Login.
    A2. FLASH client 72 sets up a TCP/IP connection with the terminal manager 50.
  B. Terminal manager 50 instantiates presentation manager (PM) 70 and user agent 66 for the terminal and passes the connection reference of the user agent 66 to the presentation manager 70.
  C. The TCP/IP connection is passed from the terminal manager 50 to the presentation manager 70 and now the FLASH client 72 directly communicates with the presentation manager 70.
  D. Presentation manager 70 instantiates the call control system (CCS) 68.
  E. The user either registers or if he or she has already registered enters his or her username and password.
  F. This registration/login information is sent to the presentation manager 70 in XML format.
  G. The presentation manager 70 invokes the translator 54 to parse the registration/login information.
  H. The call control system 68 gets the extracted information from the translator 54.
  I. If the information is pertaining to registration information call control system 68 stores this information in the database 58 else, if the user is logging in, call control system 68 accesses the database to authenticate the user.

J. Call control system 68 passes username to the user agent 66.

K. Call control system 68 passes username and user agent 66 reference to Super user agent 64.

L. If the user is registering, Super user agent 64 creates a REGISTER message on behalf of the user and sends it to the SIP Proxy 19. This completes the registration of the user with the SIP Proxy 19.

M. Call control system 68 generates a service request to the graphical server 40 for the main FLASH page that can allow the user to make and receive calls.

N. The graphical server 40 returns the URL of this FLASH page.

O. Call control system 68 passes the URL in XML format to the presentation manager 70.

P. Presentation manager 70 passes the URL to the FLASH client 72.

Q. The built-in XML parser in FLASH parses the XML message and loads the page from the given URL.

Figure 6:
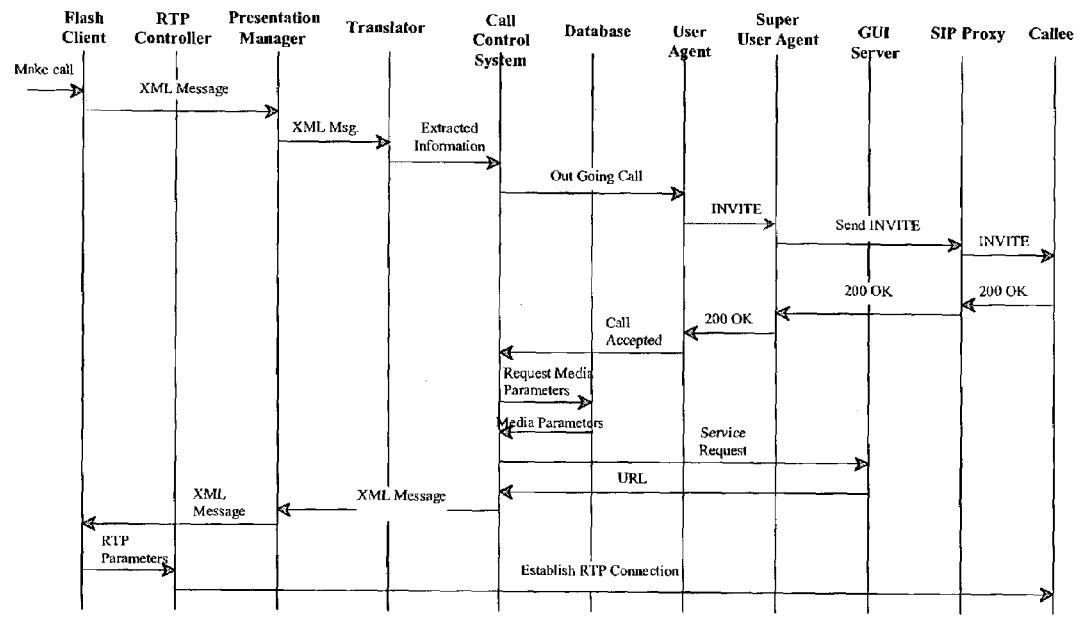
FIG. 6 illustrates a call flow for an outgoing call from a terminal.

FIG. 6 illustrates a call flow for an outgoing call from a terminal 32.

Figure 7:
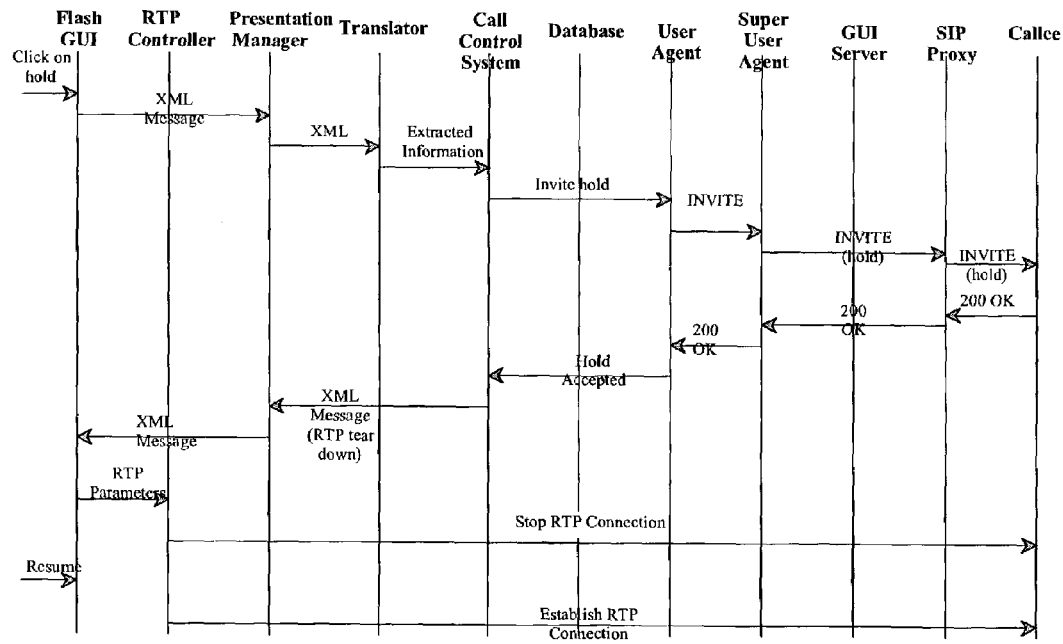
FIG. 7 illustrate a call flow for putting a caller on hold.

FIG. 7 illustrate a call flow for putting a caller on hold. For purposes of illustration, the call flow associated with the "resume" action (by the user) and the "establish RTP connection" signal are not shown; this call flow would be similar to that shown between the initial "click on hold" action and the "stop RTP connection" signal.

While the preferred embodiment of the invention has been discussed using specific languages and protocols, it would be known to one skilled in the art that alternative languages, application development tools, and protocols could be used in their place for a given implementation. For example, JAVA could be replaced in whole or part by C++ or similar programming environment and SIP could be replaced by H.323.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A communications system comprising:
   a digital network;
   a plurality of communication devices coupled to said network for enabling communications sessions responsive to commands conforming to a known protocol;
   a plurality of processing devices coupled to said network, said processing devices having a display and being capable of communicating by sending and receiving packetized data over said network during said communications sessions; and
   one or more graphical proxy servers coupled to a plurality of said processing devices for:
      registering on behalf of associated processing devices via terminal management circuitry associated with said graphical proxy servers, such that messages intended for said processing devices are received by said one or more graphical proxy servers;
      in response to receiving messages in said known protocol intended for a particular processing device, graphical server circuitry generating user interfaces for said particular processing device, such that said particular processing device does not need to interpret messages in said known protocol;
      in response to receiving control information regarding user interaction with said user interface, said terminal management circuitry generating messages in said known protocol on behalf of registered processing devices.

2. The communications system of claim 1 wherein said processing device comprises a personal digital assistant.

3. The communications system of claim 1 wherein said processing device comprises a personal computer.

4. The communications system of claim 1 wherein said terminal management circuitry further comprises circuitry for instantiating a terminal controller for each registered processing device, wherein each terminal controller controls communication between an associated processing device and the graphical proxy server.

5. The communications system of claim 4 wherein each terminal controller includes a user agent for receiving and sending messages in said known protocol.

6. The communications system of claim 5 wherein each graphical proxy server further comprises a super user agent for receiving messages from said communication devices and passing said messages to an identified user agent.

7. The communications system of claim 5 wherein each terminal controller further comprises a presentation manager for managing the user interface on the associated processing device.

8. The communications system of claim 7 wherein each presentation manager maintains information regarding multiple connections to the associated processing device in respective folders.

9. A method of communicating over a digital network, where the communication is between first devices which control communications using a known protocol and second devices which do not control communications using said known protocol, comprising the steps of:
   associating said second devices with graphical proxy servers;
   in each graphical proxy server:
      mapping addresses of associated second devices to the graphical proxy server, such that messages intended for said associated second devices are received by the graphical proxy server;
      generating user interfaces in response to said messages;
      transmitting said user interfaces to said associated second devices, such that said second devices have an interactive display responsive to said messages, without circuitry to interpret messages in said known protocol; and
      instantiating a respective terminal controller for each active second device, wherein each terminal controller controls communication between the active device and the graphical proxy server.

10. The method of claim 9 and further comprising the step of:
   in each said graphical proxy server, receiving all messages intended for active second devices in a super agent module and passing each received messages to a user agent module in the terminal controller associated with the active second device for which the message was intended.

11. A graphical proxy server for controlling communications between first devices which control communications using a known protocol and second devices which do not control communications using said known protocol, comprising:

processing circuitry for:
associating the graphical proxy server with said second devices;
mapping addresses of associated second devices to the graphical proxy server, such that messages intended for said associated second devices are received by the graphical proxy server,
generating user interfaces in response to said messages;
transmitting said user interfaces to said associated second devices, such that said second devices have an interactive display responsive to said messages without circuitry to interpret messages in said known protocol; and
instantiating a respective terminal controller for each active second device, wherein each terminal controller controls communication between the active device and the graphical proxy server.

12. The graphical proxy server of claim 11 wherein said processing circuitry receives all messages intended for active second devices in a super agent module and passing each received message to a user agent module in the terminal controller associated with the active second device for which the message was intended.

* * * * *